No. 882,753. PATENTED MAR. 24, 1908.
D. D. GRANT.
TROLLEY WHEEL.
APPLICATION FILED FEB. 11, 1907.
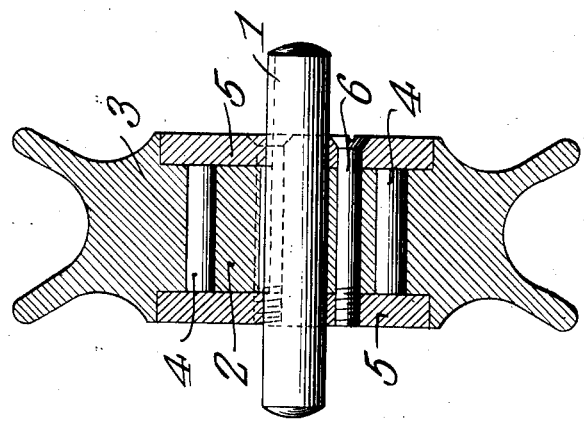
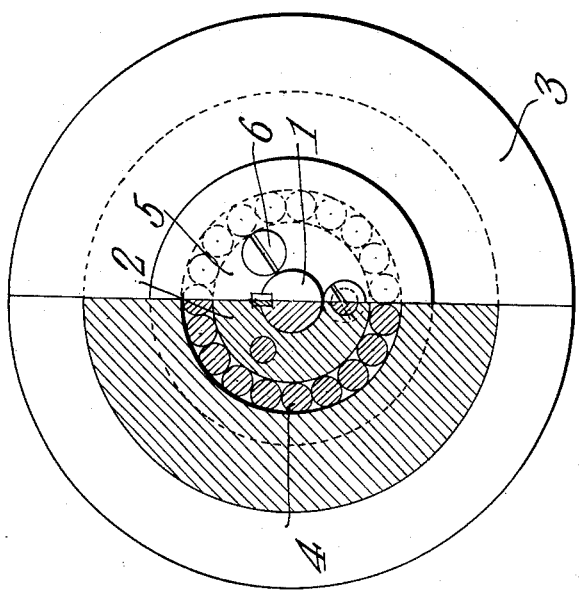
WITNESSES:
Daniel D. Grant,
INVENTOR.
By C. A. Snow & Co.
ATTORNEYS

UNITED STATES PATENT OFFICE.

DANIEL D. GRANT, OF PITTSFIELD, MASSACHUSETTS.

TROLLEY-WHEEL.

No. 882,753.           Specification of Letters Patent.      Patented March 24, 1908.

Application filed February 11, 1907. Serial No. 356,839.

*To all whom it may concern:*

Be it known that I, DANIEL D. GRANT, a citizen of the United States, residing at Pittsfield, in the county of Berkshire and State of Massachusetts, have invented a new and useful Trolley-Wheel, of which the following is a specification.

This invention relates to trolley wheels and its object is to provide a simple and durable device of this character having a roller bearing of simple and compact form the parts of which are securely held against displacement and are protected against the admission of dust, etc., thereto.

With this and other objects in view the invention consists of certain novel features of construction and combinations of parts which will be hereinafter more fully described and pointed out in the claims.

In the accompanying drawings is shown the preferred form of the invention.

In said drawings: Figure 1 is a view partly in side elevation and partly in section of a wheel constructed in accordance with the present invention; and Fig. 2 is a central transverse section through the wheel.

Referring to the figures by characters of reference, 1 is the axle of the wheel on which is keyed or otherwise secured a cylindrical core 2. This core is surrounded by the wheel 3 which is in the form of a ring, the interior diameter of which is considerably greater than the diameter of the core 2 so as to permit anti-friction rollers 4 to be placed between the ring and the core. These rollers extend entirely around the core and are held against end movement by guard disks or plates 5 which are secured upon opposite faces of the core by means of bolts or screws 6. These screws extend through openings in the guard plates and also through the core as shown particularly in Fig. 2 and are preferably screwed into one of the plates so that by turning the screws in one direction the two plates may be drawn tightly against opposite faces of the core. The side faces of the ring 3 are countersunk to receive the peripheral portions of the plates 5 and therefore these plates serve not only to hold the rollers against longitudinal movement but also prevent the admission of dust, etc., into the space between the ring and the core.

It will be seen that a wheel constructed in the manner herein described will rotate freely upon its axle and its construction is so simple that repairs will seldom if ever be necessary. Should one or more of the rollers become broken or worn it can be easily removed by detaching one of the guard plates.

What is claimed is:

In a trolley wheel, the combination with an axle and a core secured thereon; of a ring surrounding the core and constituting the wheel body, the sides of said ring being countersunk, a circular guard plate upon one face of the core and having threaded openings therein, a similar plate upon the opposite face of the core and having openings therein, the peripheral portions of the two plates being disposed within the countersunk portions of the ring, bolts extending through the openings in the last mentioned plate and engaging the threads in the first mentioned plate, said bolts extending through the core, and disposed to bind the plates thereon, said plates constituting means for preventing independent lateral movement of the core and ring, and a continuous series of anti-friction rollers interposed between the core and ring and movable around the core, said guard plates being disposed to hold the rollers against longitudinal movement.

In testimony that I claim the foregoing as my own, I have hereto affixed my signature in the presence of two witnesses.

DANIEL D. GRANT.

Witnesses:
ROBERT BRUCE DONALDSON,
EDWARD T. SCULLY.